United States Patent

[11] 3,554,344

[72] Inventors James R. Summer
Brielle;
Henry C. MacLaughlin, New Shrewsbury;
Clarence S. Melander, Neptune, N.J.
[21] Appl. No. 752,355
[22] Filed Aug. 13, 1968
[45] Patented Jan. 12, 1971
[73] Assignee The Garrett Corporation
Los Angeles, Calif.
a corporation of California

[54] VARIABLE LENGTH INFLATABLE ESCAPE SLIDE
14 Claims, 8 Drawing Figs.
[52] U.S. Cl. ................................................. 193/25,
182/48
[51] Int. Cl. ....................................................... B65g 11/10
[50] Field of Search ............................................ 193/25,
250, 25IE, 25B, 25X; 182/48; 244/137

[56] References Cited
UNITED STATES PATENTS
2,936,056  5/1960  Heyniger ..................... 193/25

3,391,771  7/1968  Day ................................ 193/25
3,463,266  8/1969  Day ................................ 182/48

Primary Examiner—Andres H. Nielsen
Attorneys—Orville R. Seidner and John N. Hazelwood ABSTRACT: A lower extensible end portion of an inflatable escape slide is tucked or stowed and retained uninflated by restraint flaps enclosing the end portion intermediate the slide ends, and closed by quick release grip means on the flap edges. A cable, cooperable with the grip means, passes through a one-way lock assembly and terminates with a weighted mass. When the upper end of the slide is below a predetermined height, the mass weight contacts the ground and the cable is not active to open the closed and locked flaps. Above the predetermined height, the mass fails to make ground contact and its weight draws the cable through the one-way lock assembly which locks the cable against reverse movement, inflation of the slide causing the cable to release the restraint flaps and permit the lower extensible end portion of the slide to inflate and extend.

PATENTED JAN 12 1971
3,554,344
SHEET 1 OF 2
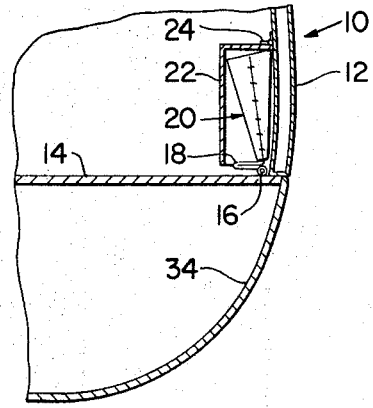
FIG.1
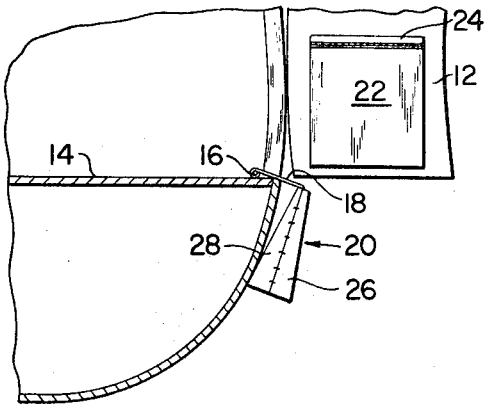
FIG.2
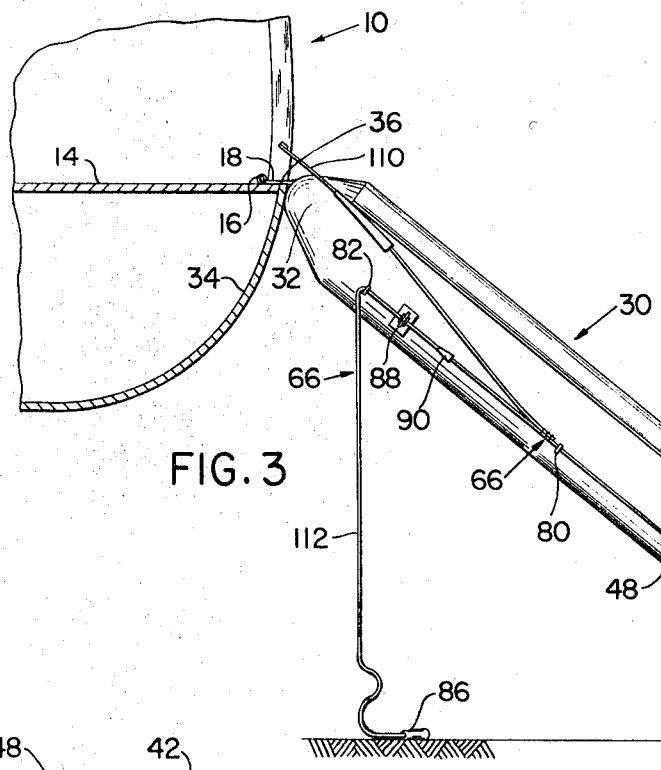
FIG.3
FIG.5
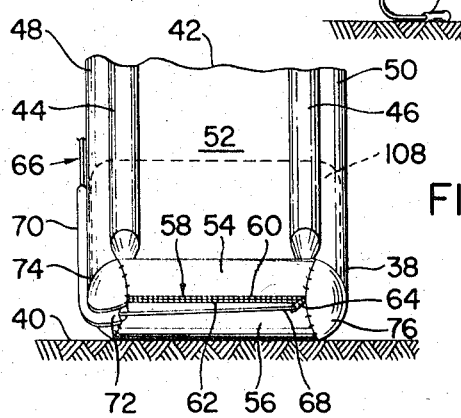
FIG.4
INVENTORS.
HENRY C. MacLAUGHLIN
CLARENCE S. MELANDER
JAMES R. SUMMER
BY
Orville R. Seidney
AGENT

PATENTED JAN 12 1971

INVENTORS.
HENRY C. MacLAUGHLIN
CLARENCE S. MELANDER
BY JAMES R. SUMMER

AGENT

VARIABLE LENGTH INFLATABLE ESCAPE SLIDE

BACKGROUND OF THE INVENTION

This invention relates in general to the art of flexible wall chutes, and relates in particular to inflatable escape slides provided on aircraft and the like for facilitating the safe and rapid egress of persons or cargo from an aircraft under adverse conditions such as a forced landing at locations where no rigid stair, ramp or gangplank is available, the egress opening or exit door in such cases usually being elevated quite some distance above the ground. It has been customary to provide inflatable escape slides for aircraft such as those patterned after the escape slide shown and described in U.S. Pat. No. 2,936,056, issued May 10, 1960, in the name of William L. Heyniger. In that patent a variable length escape slide is shown which provides for substantially optimum rate of descent for evacuees of the aircraft under conditions of variable height of the door sill above ground. The latter condition may occur, for example, in the case of collapse of the nose gear of the aircraft or malfunction of its extending mechanism which precludes it from normal extension prior to landing of the aircraft.

Descent rate of evacuees on an inflatable slide is governed to a very large extent by the angle between the slide surface and the ground. Optimum rate is usually achieved when the angle is between about 30° as a minimum and about 50° as a maximum. The less the angle, the less chute action obtained and evacuation does not proceed with dispatch. If the angle is very much more than about 50°, the slide surface is too precipitous and evacuees may be somewhat stunned or even injured upon impact with the ground and fail to make way quickly for the next evacuee.

The aforesaid Heyniger patent discloses an inflatable slide member having a lower end portion which may be tucked back into its medial portion and retained in that condition by a quick release gripping mechanism, disclosed as a slide fastener having a quick release slider arranged to engage or disengage successive spaced-apart fastener elements cooperatively disposed on fastener stringers secured on the slide member intermediate the lower end and medial portions thereof. The release slider is adapted to hand manipulation, and, as the patent states, "it is preferable to remove or release the slider 21 prior to inflation." Thus the known slides of the prior art, which are variably extensible in length, require a manual act, predicated on human judgment as to the need for the act, to have a variation of length executed.

SUMMARY OF THE INVENTION

The present invention picks up where the prior art leaves off, by providing a simple and reliable height-sensing means coupled with the quick release gripping mechanism or releasing means, the height-sensing means serving to activate the releasing means only when the sill of the aircraft (and thus the upper end of the slide) is higher than a predetermined height above the ground. By this means the inflatable lower-extensible end portion of the slide, which is normally retained in a substantially deflated condition and folded adjacent or tucked into a portion of the slide, is automatically released to inflate and deploy only when such extended deployment is desirable or necessary.

In other words, human judgment at a time of possible emotional stress is not a principal decisional factor for the determination of whether or not to extend the slide.

This is important because in the case of an emergency situation involving an aircraft landing, there may or may not be a requirement for slide extension and human judgment ought not be a decisional requirement at a time of extreme emotional stress. Thus, if there is an actual requirement for deployment extension and the human manual act has not been made, in that event it is possible that the slide would hang almost vertically from the door and constitute a useless escape means. On the other hand, if there is no actual requirement for extension and the manual release act has been performed, the slide would extend with such a shallow slant surface angle relative to the ground that its chute function would be all but precluded.

Accordingly, the present invention not only provides an automatic function to replace a manual function, but also obviates those situations where the manual function cannot be depended upon to be performed with precision and logic.

It will be noted that with this decisional requirement deleted from the emergency procedures of the crew of the aircraft, the efforts of the crew can be more expeditiously directed to assisting and aiding the passengers in the evacuation procedure in a more orderly manner.

Accordingly, it is a general object of the invention to provide a variable length slide having a deployable portion on one end thereof which is deployable automatically upon the occurrence of a predetermined condition wherein the other end of the slide is at a greater height than a predetermined height.

BRIEF DESCRIPTION OF THE DRAWINGS

FIG. 1 is a highly schematic illustration in elevated cross section of a portion of an aircraft at an emergency door location;

FIG. 2 is an illustration similar to FIG. 1, but showing the emergency door opened and the container package for the slide of the present invention deployed from its stowage compartment on the door;

FIG. 3 is a view similar to FIG. 2, but showing the inflated slide in side elevation, the sill of the aircraft being disposed at a normal height above the ground plane;

FIG. 4 is a front elevation view of the lower end of the slide of FIG. 3;

FIG. 5 is a cross section view of a portion of the escape slide, taken on the line 5—5 of FIG. 3;

DESCRIPTION OF THE PREFERRED EMBODIMENT

Figure 7:
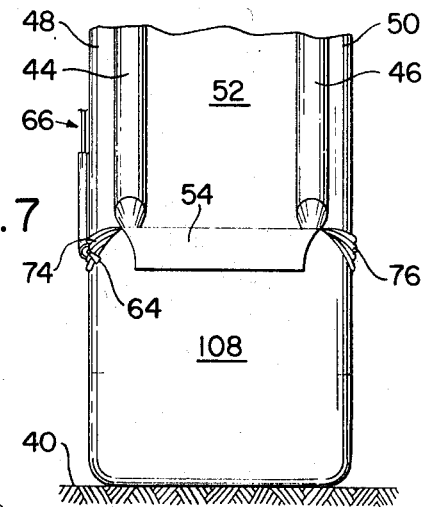
FIG. 7 is a front elevation view of the lower end of the slide of FIG. 6.

In FIG. 1 the aircraft 10 is shown in cross section at an emergency door station with the emergency door 12 shown in closed position. The floor 14 of the aircraft has secured to it, adjacent the sill of the door 12, a girt bar 16 to which is secured the girt 18 which forms a part of the upper end of the inflatable escape slide to be described later. The said slide is disposed deflated and folded within a soft container package 20 which is loosely confined behind a compartment-forming hard container 22 which is open at the bottom and pivotally mounted on the door as by a hinge 24. Thus, when the door 12 is opened in the event of an emergency, the container 22 swings slightly out and upwardly to release the package 20 in order for it to hang from the girt bar 16 by the girt 18 outside the aircraft, as depicted in FIG. 2.

It will be appreciated that the mode of stowing the uninflated slide in the aircraft is of no concern with the present invention, and that other compartment, container or package arrangements could be effected at the behest of the designer without detracting from the essential novelty of the invention. It will also be apparent that the slide about to be described could be coupled at one end to the aircraft 10 by means other than the particular girt and girt bar arrangement shown. The girt bar 16 may, of course, be secured to the aircraft 10 by means already known in the art as exemplified by the aforesaid Heyniger patent, or by any other means preferred by those skilled in the art.

The soft container package 20 of FIGS. 1 and 2 envelopes the deflated escape slide and maintains the said slide in compactly folded condition, and to this end, may comprise a front flap 26 whose peripheral edges may be cooperatively joined by readily disengageable means to the compartment-portion 28 of the package 20. The disengageable means may comprise, for example, a Velcro hook and pile arrangement which permits relatively simple and quick disengagement of the flap 26 from the portion 28 upon the advent of inflation procedure for the slide proper.

Disengageable arrangements of various kinds and types are well-known in the art and need not be described herein in further detail or as alternate embodiments since they form no part of the invention. It is preferred that the disengagement of the slide-engaging portions of the container package 20 be automatically effected when the slide inflation is initiated. It is apparent, of course, that the disengageable means could be a relatively simple loop and grommet arrangement coupled to a cord or cable which could be actuated manually to effect opening of the container 20 for deployment of the slide folded therewithin, the arrangement being similar to that employed in parachute packs and well-known to those skilled in the art.

Referring to FIG. 3 the slide 30, which was contained in deflated and folded condition within the container 20 of FIG. 2, is shown as inflated and deployed. The girt 18 which comprises a fabric apron extension of the upper end of the slide surface of the slide 30 thus holds the upper end 32 of the slide 30 securely against the outer skin 34 of the aircraft 10 immediately adjacent the door sill 36 while the lower end 38 rests on the ground or other ground plane 40. The inflation configuration of the slide 30 as depicted in FIG. 3 is that obtained when the door sill 36 is at its normal height above the ground plane 40. This configuration can be conveniently referred to as a normal inflation configuration.

Referring again to FIG. 3 and also to FIG. 4 the slide 30 is shown as comprising a single fluid-trussed beam 42 surmounted by a pair of inflatable hand rails 44 and 46, disposed adjacent the side edges 48 and 50 of the beam 42. The top surface of the beam 42 between the hand rails 44 and 46 thus provides the slide surface 52 which may be substantially flat across, as shown, or of somewhat rounded configuration as disclosed in the aforementioned Heyniger patent. A flat slide surface could also be provided, if desired, by fabricating the slide after the manner disclosed in U.S. Pat. No. 3,102,623, issued Sept. 3, 1963, in the names of Kenneth N. Schacht et al. The particular slide configuration is immaterial and does not affect the novelty of the invention, the features of which will not be described and which will be seen to be applicable to all known inflatable slide configurations.

Referring to FIGS. 3 and 4, the lower end 38 of the slide 30 comprises top and bottom flaps 54 and 56, respectively, provided with quick release gripping or clamping structure 58 which may comprise a pair of slide fastener stringers 60 and 62 cooperable with a slider 64 whereby the edges of the flaps 54 and 56 may be secured together, but quickly releasable upon actuation of the slider 64 by means of a cord or cable 66, the lower end 68 of which is secured to the slider 64. The cord 66 is disposed within a guide channel 70 the lower end 72 of which is fixedly secured to a side flap 74 formed on one side of the lower end 38 of the slide 30. A side flap 76 is formed on the other side of the lower end 38.

The flaps 74 and 76 are joined respectively to the side edges of the top and bottom flaps 54 and 56 by means which retain the edges securely in the normal inflation configuration of the slide 30, but which are readily disjoined upon the advent of separation of the edge of the flap 54 from the edge of the flap 56 by, for example, the movement of the slider 64 from the position shown to the other end of the stringers 60 and 62 by a pull force exerted on the cord 66. The joinder means aforesaid may be, for example, breakable threads or any other type of breakaway joint means such as cord loops and grommets of the type which may be employed to couple the slide enclosing portions of the container package 20 as aforesaid.

The guide channel 70 is secured as by sewing or bonding to, and extends upwardly along, the side edge 48 of the beam 42 for a distance sufficient to enable guidance of the cord 66 through a plurality of guide loops shown in FIG. 3 as being four and numbered as 78, 80 and 82, the latter of which is seen as being located adjacent the top end 32 of the slide 30. The guide loops 78—82 are preferably short guide elements having a cross section similar to that of the channel 70, along the lines depicted in FIG. 5. Preferably the channel 70 and the loops 78—82 are fabric or other flexible material which may be easily sewn or bonded by cementing to the beam 42.

An important feature of the invention is the cord 66 and the elements either coupled to or cooperative with it. As aforesaid, the end 68 of the cord 66 is secured to the slider 64. Disposed on the other end of the cord 66 is a weighted mass 86 which is seen as resting on the ground with some slack in the cord portion between the upper-guide 84 and the ground.

Figure 8:
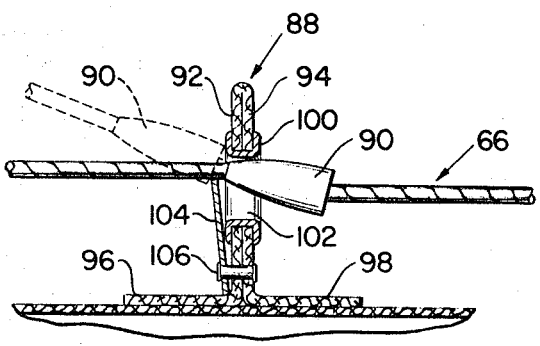
FIG. 8 is an enlarged view, partly in cross section, taken on the line 8—8 of FIG. 6.

Intermediate the guide loops 80 and 82 the cord passes through a one-way lock 88 which is cooperable with an elongate knoblike member 90 disposed on the cord 66, as best seen in FIG. 8. The lock 88 comprises a loop of fabric material, for example, formed with side-by-side leg portions 92 and 94, terminating in foot portions 96 and 98 which are secured on the outer surface of the side edge 48 of the slide by sewing or cementing. A rigid grommet 100 on the leg portions 92 and 94 defines a passageway 102 through which the cord 66 passes. It will be observed that the passageway 102 is sufficiently large enough to permit the tapered member 90 to pass through also. A lock plate 104 of rigid material (as distinguished from the flexible material of which the leg portions 92 and 94 are comprised) is secured to the leg portions 92 and 94 at least a slight distance from the peripheral edge of the grommet 100 by means of a pop rivet 106.

It is now apparent from the structure of the lock 88 shown and described that the narrow nose end of the tapered member 90 guides the cord 66 and the member 90 through the passageway 102 of the grommet 100 (from right to left as viewed in FIG. 8) and past the rigid member 104 which is thereupon displaced slightly away from the grommet 100 by reason of the flexibility of the leg portions 92 and 94. When the entire tapered member 90 is through the grommet 100 with the abrupt back end of the member 90 past the rigid member 104, as shown in dotted lines in FIG. 8, the member 104 cooperates with the tapered member 90 and the grommet 100 to prevent reverse travel of the cord 66 from left to right back through the passageway 102, for a purpose described below with particular reference to FIGS. 6 and 7.

Figure 6:
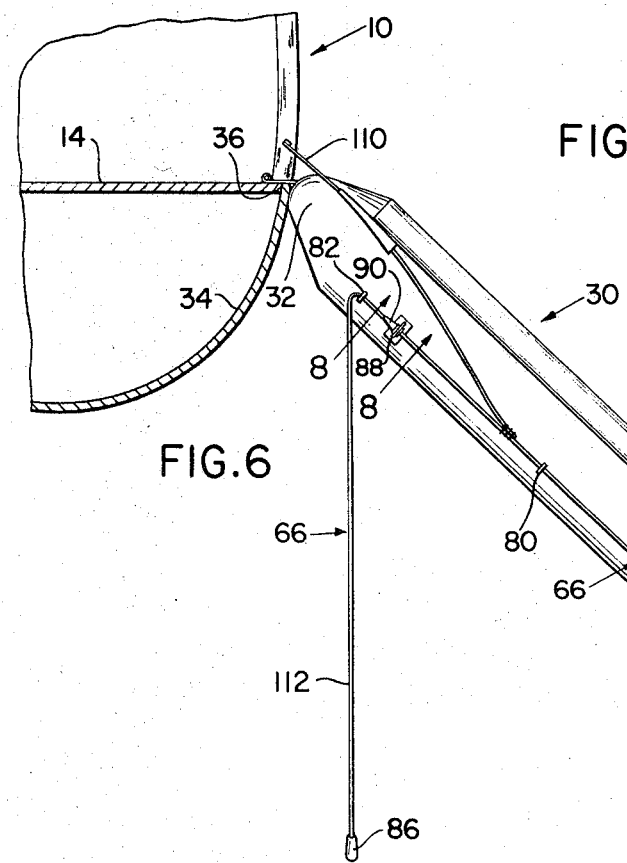
FIG. 6 is a view similar to FIG. 3, but showing the fully extended slide when the aircraft sill is at a higher than predetermined height above the ground plane.

In FIG. 6, it is seen that the aircraft 10 is positioned with the door sill 36 at a considerably higher elevation above the ground plane 40 than is the case with that shown in FIG. 3, and the weighted mass 86 is seen as suspended above the ground plane 40, although this may or may not necessarily be the case in a particular situation.

The slide 30 is seen in FIGS. 6 and 7 with the flaps 54, 56, 74 and 76 disengaged from each other, as a consequence of which the extensible portion 108 of the slide 30 is inflated and deployed. As will be seen, referring back to FIG. 3, the extensible portion 108 is normally retained uninflated within the slide 30 behind the secured flaps, along the lines shown and described in the aforesaid Heyniger patent.

Thus, when the slide fastener 64 is moved from right to left as viewed in FIG. 4, the flap stringers 60 and 62 separate from each other and the restrained slide portion 108 retained behind the flaps is then unrestrained against the initiation of inflation which thereupon breaks the side flaps 74 and 76 away from the top and bottom flaps 54 and 56 and thus permits full inflation and extension of the slide portion 108.

The slider may be moved, as aforesaid, by tension on the cord 66 which may be applied manually through an emergency pull cable 110 which has one end secured to the cord 66, or may be applied automatically by the action of the one-way lock 88 on the tapered member 90. The last-mentioned action of the lock 88 comes about as follows.

The hanging portion 112 of the cord or cable 66 is normally stored with the weight 86 within the container 20. As was noted above, after the container 20 is freed from confinement and hanging from the girt 18, as shown in FIG. 2, the slide inflation is initiated whereupon the container 20 opens to free the inflating slide 30. Also when the container 20 opens, the weighted mass 86 falls by gravity toward the ground and carries the hanging portion 112 of the cord 116 with it. The mass may or may not come to rest on the ground at this time, depending upon the height of the sill 36 above the ground. If the mass does contact the ground, the tapered member 90 is not pulled through the one-way lock 88 by the cord portion 112 and hence no pull is exerted on the slider 64 by the lower end cord portion 68, thus the flaps 54, 56, 74 and 76 will remain secured and the extensible slide portion 108 will be restrained uninflated behind the flaps. The slide 30 will thereupon have the normal inflation configuration depicted in FIG. 3.

If, on the other hand, the height of the sill 36 above the ground is such that the weight 86 does not contact the ground, then the cord portion 112 pulls the tapered member 90 through the one-way lock 88, whereafter continued inflation of the slide 30 elongates the slide more than the length of the lower cord portion 68 and the slider 64 is caused to move from the fastened condition for the flaps 54 and 56, as shown in FIG. 4, to the unfastened condition shown in FIG. 7, and the extensible slide portion 108 is free for inflation and deployment as aforesaid.

It should be noted that it is not necessarily a requirement that the slider 64 traverse the whole length of the stringers 60 and 62 in order for the lower distensible portion 38 of the slide to emerge from stowage and inflate. It is well-known that a slide fastener will contain pressure exerted upon it until the fastener has traversed a small portion of the fastener stringers, and that thereafter the pressure (or pulling force on the stringers) tends to accelerate the unfastening action of the slider. Accordingly, it is seen that it is not essential in the fastener apparatus disclosed herein for the tapered member 90 to be displaced from the lock 88 a distance equal to the total traverse of the slider 64 along the stringers 60 and 62.

It should also be noted that the quick release structure 58 may take forms other than the slide fastener arrangement shown and described. Thus, it is within the purview of the invention that quick release fastener arrangements along the lines of those employed in parachute packs, as mentioned above, could be utilized here, as well as any one of a number of other known arrangements in which the releasing mechanism is featured by a pull cord or cable having a relatively short traverse or travel distance for unfastening or releasing.

We claim:
1. A slide comprising:
a. an inflatable slide member having one end adapted to be secured to a generally upwardly disposed structure with the other end directed toward a generally horizontal ground plane;
b. a deployable slide portion on said other end of said slide member;
c. releasable restraint means normally restraining said deployable slide portion against deployment unless a release force is applied, said slide member thereby having one length of slide surface when said deployable slide portion is restrained against deployment and having a greater slide surface length when said restraint means is released;
d. releasing means coupled with said releasable restraint means for the release thereof; and
e. height-sensing means coupled with said releasing means and effective to activate said releasing means only when said one end of said slide member is higher than a predetermined height above said ground plane, said releasing means when activated cooperating with said slide member to apply said release force to said restraint means, said release force being generated by inflation of said slide member.

2. The slide of claim 1 in which said other end of said slide member comprises restraint elements normally restraining said deployable slide portion against inflation and deployment.

3. The slide of claim 2 in which said restraint elements are separable flap elements having joinable edges, and said releasable restraint means comprises quick release grip means normally joining said joinable edges together to restraint said deployable slide portion against inflation and deployment.

4. The slide of claim 3 in which said releasing means comprises cord means having one end coupled with said quick release grip means and the other end coupled with height-sensing means, and also comprises one-way lock means on said slide member and cooperable with said cord means to effect a lock of said cord means and thereby release said quick release grip means upon actuation of said lock means by said height-sensing means.

5. The slide of claim 4 in which said height-sensing means comprises a weighted mass disposed on said one end of said cord means.

6. The slide of claim 1 in which said releasing means comprises cord means and a weighted mass on one end thereof, the other end of said cable means being coupled to said restraint means.

7. The slide of claim 6 in which said releasing means also comprises one-way lock means on said slide member and cooperable with said cord means to effect a lock of said cord means and thereby release said restraint means upon actuation of said lock means by said weighted mass.

8. The slide of claim 7 in which said lock means comprises a rigid tab element flexibility mounted relative to a grommet element, said cord means passing through said grommet element, said lock means also comprising a lock activation element on said cord means, said activation element being arranged to pass through said grommet element in one direction and thereafter being locked by said tab element against reverse direction movement through said grommet element.

9. An inflatable slide comprising:
at least one inflatable beam extending longitudinally of said slide;
means for attaching one end of said slide to a support structure;
inflatable extension means on said slide and spaced from said one end;
closure means releasably restraining said extension means from inflation;
a cable extending longitudinally of said slide and connected with said closure means for releasing said closure means upon movement of said cable in one direction; and
means for moving said cable in said one direction in response to said one end of said slide being spaced at least a predetermined distance above a surface, and holding means on said slide for holding said cable against movement in the opposite direction, whereby inflation of said slide while said one end is spaced a distance greater than said predetermined distance causes said cable to release the inflatable extension means to extend the length of the slide.

10. The inflatable slide according to claim 9 wherein said closure means includes a slide fastener, said slide fastener including a slider movable along a path spaced progressively closer to said holding means in the direction of opening said closure means, and said cable being connected with said slider, whereby said cable pulls said slider to release said extension means upon displacement of said cable by said moving means.

11. The inflatable slide according to claim 9 wherein said moving means includes a weight attached to said cable and includes a guide for said cable on said inflatable slide adjacent said one end, whereby said weight is suspended from said guide for measuring the height of said one end of said slide above a support surface.

12. The inflatable slide according to claim 11 wherein said cable holding means includes a lock on said inflatable slide adjacent said one end, and abutment means on said cable adapted to pass through said lock in response to drawing said cable longitudinally through said guide toward said one end of said slide, said abutment means engaging said lock to prevent said abutment means from moving relative to the lock toward the opposite end of said inflatable slide.

13. An inflatable slide comprising:
   at least one inflatable beam extending longitudinally of said slide;
   inflatable extension means on said slide and spaced from one end of said beam;
   closure means spaced from said one end of the beam for releasably restraining said extension means from inflation;
   cable means connected at one end with said closure means;
   holding means on said beam between said closure means and said one end of the beam for selectively holding said cable means against lengthwise movement when being held by said holding means, the length of said cable means between said holding means and said closure means being less than the length of said beam between said holding means and said closure means; and
   means for operating said holding means in response to measurement of at least a predetermined height of said one end of the beam above a surface.

14. The inflatable slide according to claim 13 wherein said operating means includes a guide adjacent said one end of said inflatable slide, said cable means extending through said guide and having a weight on said cable means spaced from said guide, whereby said predetermined height is measured by said cable between said weight and said guide.